United States Patent [19]

Speranza et al.

[11] 4,373,034
[45] Feb. 8, 1983

[54] MODIFICATION OF POLYOLS WITH EPOXY RESINS FOR USE IN FLEXIBLE POLYURETHANE FOAMS

[75] Inventors: George P. Speranza; Michael Cuscurida; Robert L. Zimmerman, all of Austin, Tex.

[73] Assignee: Texaco Inc., White Plains, N.Y.

[21] Appl. No.: 286,786

[22] Filed: Jul. 27, 1981

Related U.S. Application Data

[62] Division of Ser. No. 183,543, Sep. 2, 1980, Pat. No. 4,316,991.

[51] Int. Cl.$^3$ .................. C08G 18/14; C08G 18/48
[52] U.S. Cl. .................. 521/177; 521/174; 521/914
[58] Field of Search .................. 521/914, 174, 177

[56] References Cited

U.S. PATENT DOCUMENTS 3,010,940  11/1961  Charlton et al. .................. 260/47
3,012,984  12/1961  Hudson .................. 260/31.2
3,317,609   5/1967  Lesesne .................. 260/584
3,448,046   6/1969  Schalin .................. 252/8.1

OTHER PUBLICATIONS

Chemical Abstracts 78: 160468x (1973), Belgian Pat. 785,020, (12/72), Jacques, et al., Modified Epoxy Resins.
Chemical Abstracts 66: 561276 (1967), Neth. Appl. 6,605,205, (10/66), Fire-Resistant Polyurethanes.
Chemical Abstracts 76: 34874x (1972), Japanese Kokai 71-24,255, (7/71), Toshiyuki, et al., Polyurethane Foams.
Chemical Abstracts 75: 77767m (1971), Ger. Offen. 2,056,080, (5/71), Hawkins, Hardenable Epoxy Resin Compositions.
Chemical Abstracts 72: 44631x (1970), Ger. Offen. 1,905,696, (12/69), Davis, et al., Polyurethane Latexes.

*Primary Examiner*—H. S. Cockeram
*Attorney, Agent, or Firm*—Robert A. Kulason; Kenneth R. Priem; David L. Mossman

[57] ABSTRACT

The modification of polyether polyols by their reaction with epoxy resin and alkylene oxides is described. The modified polyols of 2000 to 7000 molecular weight produce flexible polyurethane foams that have higher load bearing properties than foams made with nonmodified polyols. The ability of a modified polyol to make a higher load bearing foam is related to the position in the polyol chain the epoxy resin is added.

12 Claims, No Drawings

MODIFICATION OF POLYOLS WITH EPOXY RESINS FOR USE IN FLEXIBLE POLYURETHANE FOAMS

This is a division of application Ser. No. 183,543 filed Sept. 2, 1980, now U.S. Pat. No. 4,316,991, issued Feb. 23, 1982.

This application is related to application Ser. No. 329,917 filed on Dec. 11, 1981, and U.S. Pat. Nos. 4,309,532 and 4,323,658.

BACKGROUND OF THE INVENTION

1. Field of the Invention

The invention relates to the modification of polyols by the addition of epoxy resin and, more particularly, relates to the addition of epoxy resin to polyols at places other than the end of the polyol chain to produce a modified polyol suitable for use in improved flexible foams.

2. Description of the Prior Art

Presently, polyether polyols suitable for use in flexible foams are made by the reaction of glycerine with mixtures of alkylene oxides. Persons skilled in the art of making polyols can add alkylene oxides to polyhydric initiators such as glycerine or to an intermediate molecular weight alkylene oxide adduct of the initiator to prepare products in the 40-60 hydroxyl number range. While generally satisfactory, foam prepared from these prior art polyols are not firm enough for many cushioning applications particulary at lower foam densities. Conventional means of producing firmer (higher ILD) foams such as higher functionality initiators, short chain crosslinkers or fillers lead to other deficiencies in foam properties such as closed cells, poor tear and elongation properties and increased foam density. It is, therefore, an object of this invention to increase the functionality of triols by their reaction with epoxy resins to prepare a new type of polyether polyol which would produce useful flexible foams. The polyols of this invention would also be expected to find application in semiflexible foam and reaction injection molded elastomer.

Other patents disclose reactions involving polyols and epoxy resins. Japanese Pat. No. 71-24,255 concerns the reaction of a glycerine-based 3,000 molecular weight triol with 2% bisphenol A epoxy resin to produce foams with increased hardness. A close examination of this patent will show that the epoxy resin is added at only the end of the triol chain. It will be shown later in the specification that where the epoxy resin is added in the polyol chain will make a substantial difference in how the modified polyol performs in producing open-celled flexible foams with improved load bearing properties. U.S. Pat. No. 3,012,984 describes how hydroxyl terminated polyesters, epoxy resins and isocyanate terminated prepolymers may be reacted in an inert organic solvent to produce metal primers and coatings. U.S. Pat. No. 3,010,940 discloses how phenol, epoxy resins, polyisocyanates and alpha-methylbenzyldimethylamine react to produce various polyurethane coatings. U.S. Pat. No. 3,448,046 describes how polyols containing chlorine are mixed with epoxy resins before reaction with an isocyanate. The free epoxides scavenge the HCl in the polyol and do not contribute to the functionality of the polyol. The reaction of an epoxide with an alcoholic hydroxyl group is set out in U.S. Pat. No. 3,317,609. Further, British Pat. No. 968,102 describes how polyols suitable for polyurethane foams may be prepared from the reaction of a polyol, and an epoxy resin in the presence of an acidic catalyst.

Further prior art polyols include those described in German Offenlegungschrifft No. 2,056,080. This patent describes how epoxy adhesives may be made by the reaction of epoxy resins with 4-mercaptobutanol-blocked urethane prepolymers which are made from toluene diisocyanate and various polyols. German Offenlegungschrifft No. 1,905,696 discloses how polyurethane lattices may be produced by chain-extending a urethane prepolymer by using the reaction product of polyethylene glycols of a molecular weight of about 5,000 to 10,000, and an aromatic diglycidyl ether. The modification of epoxy resins by heating them with added polyalkoxylated disaccharides is described in Belgium Pat. No. 785,020.

SUMMARY OF THE INVENTION

The invention concerns modified polyols suitable for use in preparing flexible polyurethane foams that are the reaction product of an initiator, having an active hydrogen functionality of from about 3 to 4, one or more alkylene oxides and an epoxy resin in such a manner that the epoxy resin is added at selected points internally along the length of the polyol chain. The invention also concerns methods of making the modified polyols, improved flexible foams from the polyols and methods of making such foams.

DESCRIPTION OF THE PREFERRED EMBODIMENTS

The modified polyols of this invention may be made by reacting a polyol initiator with one or more alkylene oxides to extend the polyol chain, and adding epoxy resin in such a manner that the epoxy resin is added at selected points internally along the length of the polyol chain. This tends to increase the overall functionality of the polyol chain. Prior art techniques discussed above add epoxy at the end only. It is recommended that at least two equivalents of hydroxyl functionality be present per equivalent of epoxy resin added to the reaction mixture to avoid gelling of the epoxy by cross linking with itself. The epoxy resin may be added before, during and/or after the addition of alkylene oxide to the polyol initiator. As shown in the examples, the best results are obtained if the resin is not added only as a "cap", that is, after all of the oxide has been added which results in the resin being attached to the end of the resulting polyol chain only. One skilled in the art who is practicing this invention may determine the best procedure with respect to when additions should be made and at what temperature and during which times the reaction mixture is to be heated within the scope of this invention.

It is well known that polyethers for polyurethane applications can be prepared by the base catalyzed reaction of propylene oxide with an initiator having a low hydrogen functionality, that is, containing from three to four reactive hydrogen atoms. Such initiators include, for example, glycerine, trimethylolpropane, 1,2,6-hexanetriol, pentaerythritol, triethanolamine, ethylenediamine and aminoethylpiperazine. If base catalysis is used, the alkaline catalysts normally employed are sodium hydroxide and potassium hydroxide. Other techniques to prepare polyols are known to those skilled in the art.

Polyether polyols having equivalent weights of up to about 750 are normally prepared in a one-step process by the reaction of propylene oxide with such an initiator. For the preparation of larger molecules, a two-step process is usually employed. In the first step, a product having an equivalent weight of from about 150 to about 750 is prepared, and in the second step this is reacted further with propylene oxide to prepare the higher molecular weight product.

The alkylene oxides useful in this invention are ethylene oxide, propylene oxide and 1,2-butylene oxide. Ethylene oxide and propylene oxide are preferred for this invention, and these reactants are used in the examples herein. More than one alkylene oxide may be added to the reaction mixture as deemed necessary by one skilled in the art practicing this invention.

It is anticipated that a wide variety of epoxy resins would be useful in practicing this invention. The vicinal polyepoxide containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolak, resorcinol, etc. The epoxy derivatives of methylene or isopropylidene bisphenols are especially preferred. The diglycidyl ether of bisphenol A is used in the examples herein. Some of these epoxy resins are known in the trade as "Epon" resins and may be obtained from Shell Chemical Co.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol,
2,4'-dihydroxydiphenylethylmethane,
3,3'-dihydroxydiphenyldiethylmethane,
3,4'-dihydroxydiphenylmethylpropylmethane,
2,3'-dihydroxydiphenylethylphenylmethane,
4,4'-dihydroxydiphenylpropylphenylmethane,
4,4'-dihydroxydiphenylbutylphenylmethane,
2,2'-dihydroxydiphenylditolylmethane,
4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2',3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides which can be amine cured and are in accordance with the instant invention includes the epoxy novolak resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolak resins can be obtained in Lee, H. and Neville, K., *Handbook of Epoxy Resins,* McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

The reaction conditions of temperature and pressure may be selected by the invention practitioner to meet certain specifications required by the polyol for a particular use. The examples herein use a pressure of about 50 psig and a temperature of about 50° to 150° C. as representative conditions for the making of modified polyols that would be useful in flexible foams. The amount of epoxy resin to be added to the reaction mixture should be such that the epoxy equivalents present are less than half of the hydroxyl functionality equivalents present in the reaction mixture. Too many epoxy equivalents in relation to the hydroxyl equivalents may cause the epoxy resin to gel by cross-linking with itself. As a result a large excess of hydroxyl equivalents may be used in the reaction mixture and still be within the spirit and scope of this invention. The modified polyol resulting from the method of this invention would preferably have a molecular weight in the range of 2,000 to 7,000. It is conceivable that higher molecular weight modified polyols could be prepared by the methods of this invention.

Examples I through IX show the preparation of the modified polyols described herein. The formulations are prepared by a similar procedure except that the epoxy resin is added at different times to the reaction mixture. There is also a slight variation as to the amount of alkylene oxide added to each reaction mixture. Examples X through XII show how modified polyols and prior art polyols may be used to prepare flexible foams, and comparative data between the two are presented.

EXAMPLE I

Into a ten-gallon kettle was charged 5 lb. polyol initiator. The polyol initiator was first prepared by the potassium hydroxide-catalyzed reaction of glycerin with three moles ethylene oxide and 6.3 moles propylene oxide. It had the following properties: hydroxyl no., mg KOH/g 267, alkalinity, mg KOH/g 25.9. The reactor was then evacuated and purged with prepurified nitrogen. A mixture of 18.7 lb. propylene oxide and 0.7 lb. ethylene oxide was then reacted at 105°–110° C. and at 50 psig. The reaction was then terminated by reaction with 0.75 lb. of the diglycidyl ether of bisphenol A. The reaction mixture was then digested for three hours. Samples were taken after each hour and analyzed for epoxy resin content using gel permeation chromatography (gpc). Basic gpc the epoxy resin had all reacted during the first hour of digestion. The alkaline product was then neutralized at 95° C. by stirring with 308 g 25% aqueous oxalic acid. The antioxidants di-t-butyl p-cresol (22.8 g) and octylated diphenylamine (2.3 g), and a filter acid (50 g) were also added at this time. The neutralized product was then vacuum stripped to a minimum pressure, nitrogen stripped and filtered. The finished product had the following properties:

| | |
|---|---|
| Acid no., mg KOH/g | 0.027 |
| Hydroxyl no., mg KOH/g | 55.0 |
| Water, wt. % | 0.01 |
| Unsaturation, meq/g | 0.034 |
| pH in 10:6 isopropanol-water | 7.2 |
| Peroxide, ppm | 0.8 |
| Viscosity, °F., centistokes | |
| 77 | 1221 |
| 100 | 592. |

EXAMPLES II–V

Examples II through V will illustrate the preparation of the polyols of this invention. They will further show the reaction of the diglycidyl ether of bisphenol A at various points of the polyol chain. All of the runs were made using the procedure of Example I. The polyol initiator was prepared as described in Example I and the alkylene oxides were mixed before addition. Charges, details of preparation and polyol properties are shown in the following table.

| Example | II | III | IV | V |
|---|---|---|---|---|
| Charge | | | | |
| Polyol initiator | 5[a] | 5[h] | 5[h] | 5[h] |
| Propylene oxide, lb. } mixed | 18.7 | 19.1 | 18.7 | 19.45 |
| Ethylene oxide, lb. | 0.7 | 0.7 | 0.7 | 0.7 |
| EPON ® 828, lb.[b] | 0.75[f] | 0.75[g] | 0.75[e] | 0.5[g] |
| Oxalic acid, g[c] | — | 77 | — | — |
| Magnesium silicate, g[d] | 354 | — | 335 | 354 |
| Di-t-butyl p-cresol, g | 22.8 | 22.8 | 22.8 | 23.2 |
| Octylated diphenylamine, g | 2.3 | — | 2.3 | 2.3 |
| Filter aid additive | — | 50 | — | — |
| Details of preparation | | | | |
| Oxide addition time, hr. | 2.6 | 3.7 | 3.5 | 3.8 |
| Temperature, °C. | 105–110 | 105–110 | 105–110 | 105–110 |
| Pressure, psig | 50 | 50 | 50 | 50 |
| EPON 828 content, wt. % | 3.0 | 3.0 | 3.0 | 2.0 |
| Properties | | | | |
| Acid no., mg KOH/g | 0.003 | 0.005 | 0.008 | 0.004 |
| Hydroxyl no., mg KOH/g | 54.7 | 57.3 | 56.8 | 56.0 |
| Water, wt. % | 0.01 | 0.01 | 0.04 | 0.01 |
| Unsaturation, meq/g | 0.04 | 0.03 | 0.035 | 0.03 |
| pH in 10:6 isopropanol-water | 7.4 | 8.1 | 7.6 | 7.5 |
| Color, Pt—Co | 25 | 30–40 | 25–30 | 10 |
| Sodium, ppm | 0.2 | 0.25 | 0.1 | 0.1 |
| Potassium, ppm | 1.2 | 10.1 | 0.3 | 0.1 |
| Peroxide, ppm | 0.75 | 0.8 | 0.8 | 0 |
| Viscosity, °F., centistokes | | | | |
| 77 | 1000 | 863 | 1131 | 708 |
| 100 | 476 | 421 | 525 | 351 |

[a]hydroxyl no., mg KOH/g 267, alkalinity, mg KOH/g 25.9
[b]diglycidyl ether of bisphenol A, the condensation product of epichlorohydrin and bisphenol A, manufactured by Shell Chemical Company, three weight percent added in each instance
[c]Added as 25% aqueous solution to neutralize the mixture
[d]BRITE SORB ® 90 made by Philadelphia Quartz Co., added as a base adsorber
[e]added as a cap
[f]added at mid point of mixed propylene oxide/ethylene oxide addition
[g]added to the polyol initiator before mixed propylene oxide/ethylene oxide addition started
[h]hydroxyl no., mg KOH/g 273, alkalinity, mg KOH/g 26.1

EXAMPLES VI–IX

The following Table presents data that illustrate that a wide variety of polyols may be modified in accordance with the procedures of this invention and that the hydroxyl number of the modified and unmodified polyols are comparable. Comparative data, for examples II, III and IV are also presented to show that many of the properties of the polyol involved have not changed with their reaction with epoxy resin.

| | | | | | | | | Standard Products | | |
|---|---|---|---|---|---|---|---|---|---|---|
| EXAMPLE | IV | II | III | VI | VII | VIII | IX | Thanol ® F-3016[a] | THANOL ® SF-5505[b] | THANOL ® SF-6503[c] |
| Type polyol | THANOL F-3016 | | | THANOL SF-5505 | | THANOL SF-6503 | | | | |
| Epoxy resin used | EPON 828[d] | | | EPON 828 | | EPON 828 | | | | |
| Wt. % resin (basis total charge) | 3.0 | 3.0 | 3.0 | 2.0 | 2.0 | 2.0 | 2.0 | | | |
| Site of diepoxide | | | | | | | | | | |

-continued
MODIFICATION OF POLYOLS WITH EPOXY RESINS

| EXAMPLE | IV | II | III | VI | VII | VIII | IX | Thanol® F-3016[a] | THANOL® SF-5505[b] | THANOL® SF-6503[c] |
|---|---|---|---|---|---|---|---|---|---|---|
| introduction | Cap | Middle | Beginning | Beginning | Middle | Beginning | Middle | | | |
| Typical Properties | | | | | | | | | | |
| Hydroxyl no., mg KOH/g | 56.8 | 54.7 | 57.3 | 33.0 | 33.8 | 26.0 | 27.4 | 55–57 | 32–36 | 25–29 |
| Unsaturation, meq/g | 0.035 | 0.04 | 0.03 | 0.06 | 0.05 | 0.06 | 0.06 | 0.04 | 0.06 | 0.05 |
| Color, Pt—Co | 25–30 | 25 | 30–40 | 30–40 | 5 | 25–30 | — | <50 | <30 | 20 |
| Viscosity, °F., cs | | | | | | | | | | |
| 77 | 1131 | 1000 | 863 | 1659 | 1798 | 3582 | 3265 | 450 cps | 750 cps | 1170 cps |
| 100 | 525 | 476 | 421 | 825 | 893 | 1717 | 1676 | 230 cps | 410 cps | 600 |

[a] 3000 molecular weight mixed poly(oxyethyleneoxypropylene)triol made by Texaco Chemical Co., Inc.
[b] 5500 molecular weight mixed poly(oxyethyleneoxypropylene)triol made by Texaco Chemical Co., Inc.
[c] 6500 molecular weight mixed poly(oxyethyleneoxypropylene)triol made by Texaco Chemical Co., Inc.
[d] diglycidyl ether of bisphenol A made by Shell Chemical Co.

EXAMPLE X

This example will illustrate the use of the polyols of Examples II through V in the preparation of flexible foam. It will further show that flexible foams made from this type polyol have higher load bearing properties, as measured with a Chatillon gage, than a prior art polyol. A Chatillon gage measures the amount of weight required to produce a 25% deformation of the foam.

Details of the formulations and foam properties are set forth in the following table. The component numbers are parts by weight. Stannous octoate is used as a catalyst in varying quantities to demonstrate the tin latitude or processing flexibility of these new polyols.

It may be seen that foams B and C made with the modified polyols are much improved in their load bearing properties over foam A made with a prior art polyol. In spite of the increase in load bearing capability, the improved foams process in a similar manner and show little or no increase in density over the prior art foam A. Similar comparisons may be made between other foams that use similar amounts of tin catalyst, that is, foams E, F, G and H have improved properties over foam D and foams J, K and L are improved over foam I.

EXAMPLE XI

The epoxy resin modified polyol in this example was produced in pilot plant operations that were scaled up from procedures used in Examples I through IX to show that the invention is workable outside the laboratory. The resin was added at the midpoint of the propylene oxide/ethylene oxide addition in this case. The initiator (glycerin+3 moles EO+6.5 moles PO) for modification is the same initiator used to prepare the prior art polyols of this example, and has a hydroxyl no. mg KOH/g of about 280.

Examination of the data in the Table below will show that the epoxy resin-modified polyol produced foams that were 12 to 15% firmer than those made from the prior art polyol without significant deterioration of other properties. For example, in every instance under the ILD test, more force is required to indent the foams made from epoxy resin modified polyols the same amount (25 and 65% of the initial 15 in.×15 in.×4 in specimen) as is required to indent the foams made from the prior art polyol. Although the elongation and tear properties are somewhat less with the modified polyol they are still quite acceptable. While breathability is slightly lower for the improved foams, other properties of the foams such as tensile and compression set agree

EXAMPLE X

| Formulation, parts by weight | A | B | C | D | E | F | G | H | I | J | K | L |
|---|---|---|---|---|---|---|---|---|---|---|---|---|
| Polyol used | | | | | | | | | | | | |
| Example III | — | 100 | — | — | 100 | — | — | — | — | 100 | — | — |
| Example IV | — | — | 100 | — | — | 100 | — | — | — | — | — | — |
| Example V | — | — | — | — | — | — | 100 | — | — | — | 100 | — |
| Example VI | — | — | — | — | — | — | — | 100 | — | — | — | 100 |
| Thanol® F-3016[a] | 100 | — | — | 100 | — | — | — | — | 100 | — | — | — |
| Water | 4.6 | 4.6 | 4.6 | 4.6 | 4.6 | 4.6 | 4.6 | 4.6 | 4.6 | 4.6 | 4.6 | 4.6 |
| L-6202 silicone[b] | 1.0 | 1.0 | 1.0 | 1.0 | 1.0 | 1.0 | 1.0 | 1.0 | 1.0 | 1.0 | 1.0 | 1.0 |
| N,N—Dimethylethanolamine[c] | 0.4 | 0.4 | 0.4 | 0.4 | 0.4 | 0.4 | 0.4 | 0.4 | 0.4 | 0.4 | 0.4 | 0.4 |
| Stannous octoate (50%)[d] | 0.3 | 0.3 | 0.3 | 0.4 | 0.4 | 0.4 | 0.4 | 0.4 | 0.5 | 0.5 | 0.5 | 0.5 |
| Toluene diisocyanate | 60.4 | 60.4 | 60.4 | 60.4 | 60.4 | 60.4 | 60.4 | 60.4 | 60.4 | 60.4 | 60.4 | 60.4 |
| Index | 1.14 | 1.14 | 1.14 | 1.14 | 1.14 | 1.14 | 1.14 | 1.14 | 1.14 | 1.14 | 1.14 | 1.14 |
| Rise time, sec. | 96 | 105 | 100 | 87 | 99 | 101 | 82 | 121 | 83 | 106 | 97 | 116 |
| Density, pcf | 1.46 | 1.48 | 1.55 | 1.44 | 1.48 | 1.54 | 1.43 | 1.56 | 1.41 | 1.46 | 1.43 | 1.56 |
| Chatillon gage[e] (reading at 25% indentation, lbs) | 6.0 | 9.0 | 7.2 | 6.9 | 10.1 | 7.9 | 10.8 | 8.0 | 8.9 | 10.2 | 10.8 | 8.8 |

[a] a prior art 3000 molecular weight triol prepared by reaction of glycerin with mixtures of ethylene oxide and propylene oxide made by Texaco Chemical Co.
[b] Union Carbide Chemical Corp.
[c] THANCAT® DME, a polyurethane catalyst made by Texaco Chemical Co.
[d] T-10 urethane catalyst made by Metal and Thermit Co.,
[e] Manual Model LIC compression tester manufactured by John Chatillon and Sons, Inc.

favorably. Therefore, this example demonstrates that flexible foams can be strengthened without serious deterioration of other important properties.

EXAMPLE XI

| | Flexible Foams from Epoxy Resin-Modified Polyols | | | | | | | |
|---|---|---|---|---|---|---|---|---|
| Foam Number | A | B | C | D | E | F | G | H |
| Formulation, pbw | | | | | | | | |
| Epoxy resin modified polyol | 100[a] | 100[a] | 100[a] | 100[b] | 100[b] | 100[c] | 100[c] | 100[c] |
| Water | 4.6 | 4.6 | 4.6 | 4.6 | 4.6 | 4.6 | 4.6 | 4.6 |
| L-6202 silicone | 1.0 | 1.0 | 1.0 | 1.0 | 1.0 | 1.0 | 1.0 | 1.0 |
| Stannous octoate (50%) | 0.4 | 0.5 | 0.6 | 0.3 | 0.4 | 0.4 | 0.5 | 0.6 |
| Dimethylethanol-amine | 0.4 | 0.4 | 0.4 | 0.4 | 0.4 | 0.4 | 0.4 | 0.4 |
| Toluene diisocyanate | 60.4 | 60.4 | 60.4 | 60.4 | 60.4 | 60.4 | 60.4 | 60.4 |
| Isocyanate index | 1.14 | 1.14 | 1.14 | 1.14 | 1.14 | 1.14 | 1.14 | 1.14 |
| Details of preparation | | | | | | | | |
| Cream time, sec. | 9 | 9 | 8 | 10 | 10 | 9 | 9 | 9 |
| Rise time, sec. | 99 | 106 | 104 | 100 | 101 | 82 | 97 | 84 |
| Properties | | | | | | | | |
| Density, pcf | 1.48 | 1.51 | 1.48 | 1.55 | 1.54 | 1.42 | 1.46 | 1.43 |
| Breathability, cfm | 1.8 | 1.7 | 1.1 | 2.9 | 2.1 | 1.4 | 1.8 | 0.0 |

[a] Example III, three weight % EPON 828 reacted at beginning of reaction, hydroxyl no. mg KOH/g. 57.3
[b] Example II, three weight % EPON 828 reacted at mid point of PO/EO addition, hydroxyl no. mg KOH/g. 54.7
[c] Example IV, three weight % EPON 828 reacted at end of PO/EO addition, hydroxyl no. mg KOH/g 56.8.

| Properties of an Epoxy Resin-Modified Polyol | | | | | | |
|---|---|---|---|---|---|---|
| Foam Number | A | B | C | D | E | F |
| Formulation, pbw | | | | | | |
| Prior Art Polyol[a] | — | — | — | 100 | 100 | 100 |
| Epoxy Resin modified polyol[b] | 100 | 100 | 100 | — | — | — |
| Water | 4.0 | 4.0 | 4.0 | 4.0 | 4.0 | 4.0 |
| L-6202 silicone[c] | 1.0 | 1.0 | 1.0 | 1.0 | 1.0 | 1.0 |
| THANCAT® TD-33[d] | 0.15 | 0.15 | 0.15 | 0.15 | 0.15 | 0.15 |
| THANCAT® DD[e] | 0.08 | 0.08 | 0.08 | 0.08 | 0.08 | 0.08 |
| 50% stannous octoate | 0.3 | 0.4 | 0.5 | 0.3 | 0.4 | 0.5 |
| Toluene diisocyanate | 50.97 | 50.97 | 50.97 | 51.3 | 51.3 | 51.3 |
| Isocyanate index | 1.08 | 1.08 | 1.08 | 1.08 | 1.08 | 1.08 |
| Properties | | | | | | |
| Density, pcf | 1.59 | 1.51 | 1.45 | 1.56 | 1.54 | 1.49 |
| ILD, 4 in, lb/50 in² | | | | | | |
| 25% | 42 | 44.5 | 46.6 | 37.3 | 39 | 40.2 |
| 65% | 76 | 79.8 | 83.5 | 65.2 | 67.6 | 71.7 |
| Tensile, psi | 17.1 | 17.0 | 16.3 | 17.5 | 18.3 | 20.2 |
| Elongation, % | 155 | 143 | 140 | 203 | 210 | 218 |
| Tear, pli | 1.65 | 1.55 | 1.58 | 2.66 | 2.94 | 2.81 |
| Compression set (Method B) | | | | | | |
| 50% | 3.3 | 4.8 | 5.4 | 3.8 | 3.1 | 5.3 |
| 90% | 3.4 | 5.2 | 7.2 | 4.0 | 4.0 | 5.0 |
| Breathability, cfm | 4.2 | 2.5 | >1.0 | 5.5 | 5.3 | 3.5 |

[a] 3000 molecular weight mixed poly(oxyethyleneoxypropylene)triol, Texaco Chemical Co., Inc.
[b] prepared in Texaco Chemical Co. pilot plant
[c] Union Carbide Chemical Corp.
[d] 33% triethylenediamine in propylene glycol; Texaco Chemical Co., Inc.
[e] Dimethylaminoethyldimethylaminopropyl ether; Texaco Chemical Co., Inc.

EXAMPLE XII

The data in this example further demonstrate the preparation of foams using the polyols of Examples II, III and IV. Upon examination, it may be seen here that although the epoxy resin EPON 828 can be added at various stages of the mixed propylene oxide-ethylene oxide addition, it preferably should be reacted internally rather than on the end as a cap. When reacted internally, the formulations have a wider tin latitude and the resultant foams were more open-celled. Foam H, prepared with a polyol that had the epoxy resin added only as a cap, shows zero breathability. The same low breathability problem would be expected with the foams of Japanese Pat. No. 71-24,255. This invention does not produce foams with breathability disadvantages because the epoxy resin is added internally instead of as a cap.

EXAMPLE XII

Many modifications and variations of the method of the invention as set forth herein may be made without departing from the spirit and scope thereof, and therefore, only such limitations should be imposed as are indicated in the claims set out below.

We claim:

1. A method for producing a flexible polyurethane foam which comprises:
    (a) making a modified polyol by reacting an initiator having an active hydrogen functionality of from 3 to 4, one or more alkylene oxides and an epoxy resin in such a manner that the epoxy resin is added internally along the length of the polyol chain, and
    (b) reacting said modified polyol with an organic polyisocyanate and one or more suitable foam catalysts in the presence of a blowing agent.

2. The method of claim 1 in which the polyol has a molecular weight of about 2,000 to about 7,000.

3. The method of claim 1 in which the alkylene oxides are taken from the group of ethylene oxide, propylene oxide and butylene oxide.

4. The method of claim 1 in which the epoxy resin is selected from the group of epoxy resins comprising the diglycidyl ether of Bisphenol A, epoxy novolak resins, and aliphatic epoxy resins.

5. The method of claim 1 in which the ratio of equivalents of hydrogen functionality to equivalent of epoxy is at least 2 to 1.

6. The method of claim 1 in which the components are reacted in the range of 50°-150° C. during the preparation of the modified polyol.

7. An improved flexible polyurethane foam produced by the reaction of a modified polyol, an organic polyisocyanate and a foam catalyst wherein the improvement comprises employing as the modified polyol one made by the reaction of components comprising an initiator having an active hydrogen functionality of from 3 to 4, one or more alkylene oxides and an epoxy resin in such a manner that the epoxy resin is added internally along the length of the polyol chain.

8. The foam of claim 7 wherein the modified polyol has a molecular weight of about 2,000 to about 7,000.

9. The foam of claim 7 wherein the modified polyol is prepared from alkylene oxides taken from the group of ethylene oxide, propylene oxide and butylene oxide.

10. The foam of claim 7 wherein the modified polyol is prepared from epoxy resins based on the diglycidyl ether of Bisphenol A, epoxy novolac resins, and aliphatic epoxy resins.

11. The foam of claim 7 wherein the modified polyol is prepared from the initiator and the epoxy resin in proportions such that the ratio of equivalents of hydrogen functionality of the initiator to equivalent of epoxy is at least 2 to 1.

12. The foam of claim 7 wherein the modified polyol components are reacted in the range of 50°–150° C. during the preparation of the modified polyol.

* * * * *